United States Patent
Wang

(10) Patent No.: US 11,603,163 B2
(45) Date of Patent: Mar. 14, 2023

(54) MOTOR MOUNTING ASSEMBLY OF AN ELECTRIC BICYCLE

(71) Applicant: Astro Tech Co., Ltd., Changhua (TW)

(72) Inventor: Cheng-Lian Wang, Changhua (TW)

(73) Assignee: Astro Tech Co., Ltd., Changhua (TW)

( * ) Notice: Subject to any disclaimer, the term of this patent is extended or adjusted under 35 U.S.C. 154(b) by 0 days.

(21) Appl. No.: 17/372,260

(22) Filed: Jul. 9, 2021

(65) Prior Publication Data

US 2022/0153385 A1 May 19, 2022

(30) Foreign Application Priority Data

Nov. 18, 2020 (TW) ................................ 109215188

(51) Int. Cl.
*B62M 6/55* (2010.01)

(52) U.S. Cl.
CPC ..................................... *B62M 6/55* (2013.01)

(58) Field of Classification Search
CPC .. B62M 6/55; B62K 2202/00; B62K 2204/00; B62K 19/30; B62K 11/02
USPC ...................... 180/206.4, 220, 228
See application file for complete search history.

(56) References Cited

U.S. PATENT DOCUMENTS

| | | | | |
|---|---|---|---|---|
| 4,412,597 A * | 11/1983 | Aiba | ....................... | B62M 7/02 248/596 |
| 5,390,758 A * | 2/1995 | Hunter | ................. | B60K 5/1208 180/227 |
| 6,315,072 B1 * | 11/2001 | Brown | .................... | B62K 11/04 180/230 |
| 2005/0218290 A1 * | 10/2005 | Muramatsu | ............ | B62K 11/04 248/674 |
| 2013/0277133 A1 * | 10/2013 | Matsuda | ................ | B62K 19/30 180/220 |
| 2016/0375954 A1 * | 12/2016 | Talavasek | .............. | B62K 19/18 180/220 |
| 2017/0096189 A1 * | 4/2017 | Moriyama | ............. | B62K 19/30 |
| 2020/0031420 A1 * | 1/2020 | Aunkst | .................... | B62J 43/16 |
| 2020/0047847 A1 * | 2/2020 | Chang | ...................... | B62M 6/45 |
| 2020/0204043 A1 * | 6/2020 | Matsushima | ........... | B60L 50/60 |
| 2021/0107593 A1 * | 4/2021 | Suzuki | ...................... | B62M 6/55 |
| 2022/0089250 A1 * | 3/2022 | Greven | .................... | B62M 6/40 |

FOREIGN PATENT DOCUMENTS

| | | |
|---|---|---|
| TW | M491620 U | 12/2014 |
| TW | I618654 B | 3/2018 |
| TW | M591069 U | 2/2020 |

* cited by examiner

*Primary Examiner* — Anne Marie M Boehler
(74) *Attorney, Agent, or Firm* — Rabin & Berdo, P.C.

(57) ABSTRACT

A motor mounting assembly of an electric bicycle has a motor-installation mount, a motor unit, and at least one adapting piece. The motor-installation mount has a mounting frame and a lateral cover. The mounting frame is annular and has a first lateral side, a second lateral side, and a lateral opening disposed on the first lateral side. The lateral cover is assembled to the first lateral side and covers the lateral opening. The motor unit is received within the motor-installation mount. Each one of the at least one adapting piece has two fastening portions. One of the fastening portions of each adapting piece is connected to the motor unit. The other fastening portion is clamped between and is connected to the lateral cover and the mounting frame.

9 Claims, 6 Drawing Sheets

MOTOR MOUNTING ASSEMBLY OF AN ELECTRIC BICYCLE

BACKGROUND OF THE INVENTION

1. Field of the Invention

The present invention relates to an accessory of a bicycle, and more particularly to a motor mounting assembly that can firmly install a motor unit on a bicycle frame.

2. Description of Related Art

Electric bicycles can be optionally driven by motors to reduce physical burden of riders and increase riding distance, and achieve multiple purposes of exercise, fitness, transportation, and travelling. Therefore, the electric bicycles are widely favored by modern riders. With the improvement of manufacturing techniques of bicycle frames and the development of minimized and lightweight motors, the motor and a pedal assembly are usually integrated on a bottom bracket of the bicycle frame to keep an appearance of the electric bicycle compact and to improve the stability and convenience of riding.

Please refer to related patents such as TW 1618654, TW M491620, and TW M591069: a bicycle frame of a conventional electric bicycle has a top tube, a head tube, a seat tube, and a down tube that are connected to each other. A motor supporting frame is disposed at bottom ends of the seat tube and the down tube for assembling and fixing a motor unit to a bottom portion of the motor supporting frame from bottom to top. However, the bicycle frame with the motor unit fixed to the motor supporting frame in a suspended manner has the following problems and limitations in terms of implementation:

1. Since the motor unit has considerable weight, and the motor unit has to bear multiple loads provided by motor driving and rider stepping, the conventional manner of fastening the motor unit to the motor supporting frame with multiple bolts is unable to provide the motor unit with sufficient stability, and durability.

2. At present, the specifications, sizes, and mounting positions of the motor units supplied by different manufacturers are different. Therefore, the motor supporting frame of each bicycle frame is usually only suitable for a specific motor unit sold by a certain manufacturer. The manufacturers have to produce bicycle frames with various types of motor supporting frames suitable for the motor units of various specifications. Not only does it have problems such as troublesome in manufacturing and processing and increased manufacturing costs on the bicycle frame, but also the rider cannot choose motor units of different brands at will. The fun of the rider to change different motor units on his own is limited.

To overcome the shortcomings of the conventional motor supporting frames of bicycle frames of electric bicycles, the present invention provides a motor mounting assembly of an electric bicycle to mitigate or obviate the aforementioned problems.

SUMMARY OF THE INVENTION

The main objective of the present invention is to provide a motor mounting assembly of an electric bicycle that can firmly install a motor unit on a bicycle frame.

A motor mounting assembly of an electric bicycle has a motor-installation mount, a motor unit, and at least one adapting piece. The motor-installation mount has a mounting frame and a lateral cover. The mounting frame is annular and has a first lateral side, a second lateral side, and a lateral opening disposed on the first lateral side. The lateral cover is assembled to the first lateral side and covers the lateral opening. The motor unit is received within the motor-installation mount. Each one of the at least one adapting piece has two fastening portions. One of the fastening portions of each adapting piece is connected to the motor unit. The other fastening portion is clamped between and is connected to the lateral cover and the mounting frame.

The advantages of the present invention include:

1. In the present invention, the motor-installation mount is an enhanced structure with the mounting frame to protect the motor unit inside the motor-installation mount. The motor-installation mount effectively promotes installation stability and durability and further enhances rigidity of the bicycle frame.

2. In the present invention, the motor unit is laterally placed inside the motor-installation mount. The motor-installation mount can be mounted by motor units of various specifications via the adapting piece. The adapting piece effectively promotes convenience of manufacturing bicycle frames and lowers cost of bicycle frame production. The adapting piece is convenient for riders to freely choose motor units of different brands and provides the rider with the fun of selecting among different motors freely.

3. In the present invention, the motor-installation mount is connected to a side of the down gibe and is free from blocking the accessing opening disposed at the bottom end of the down tube. The batteries within the down tube can be replaced from the accessing opening without removing the motor unit.

Other objects, advantages, and novel features of the invention will become more apparent from the following detailed description when taken in conjunction with the accompanying drawings.

DETAILED DESCRIPTION OF PREFERRED EMBODIMENTS

Figure 1:
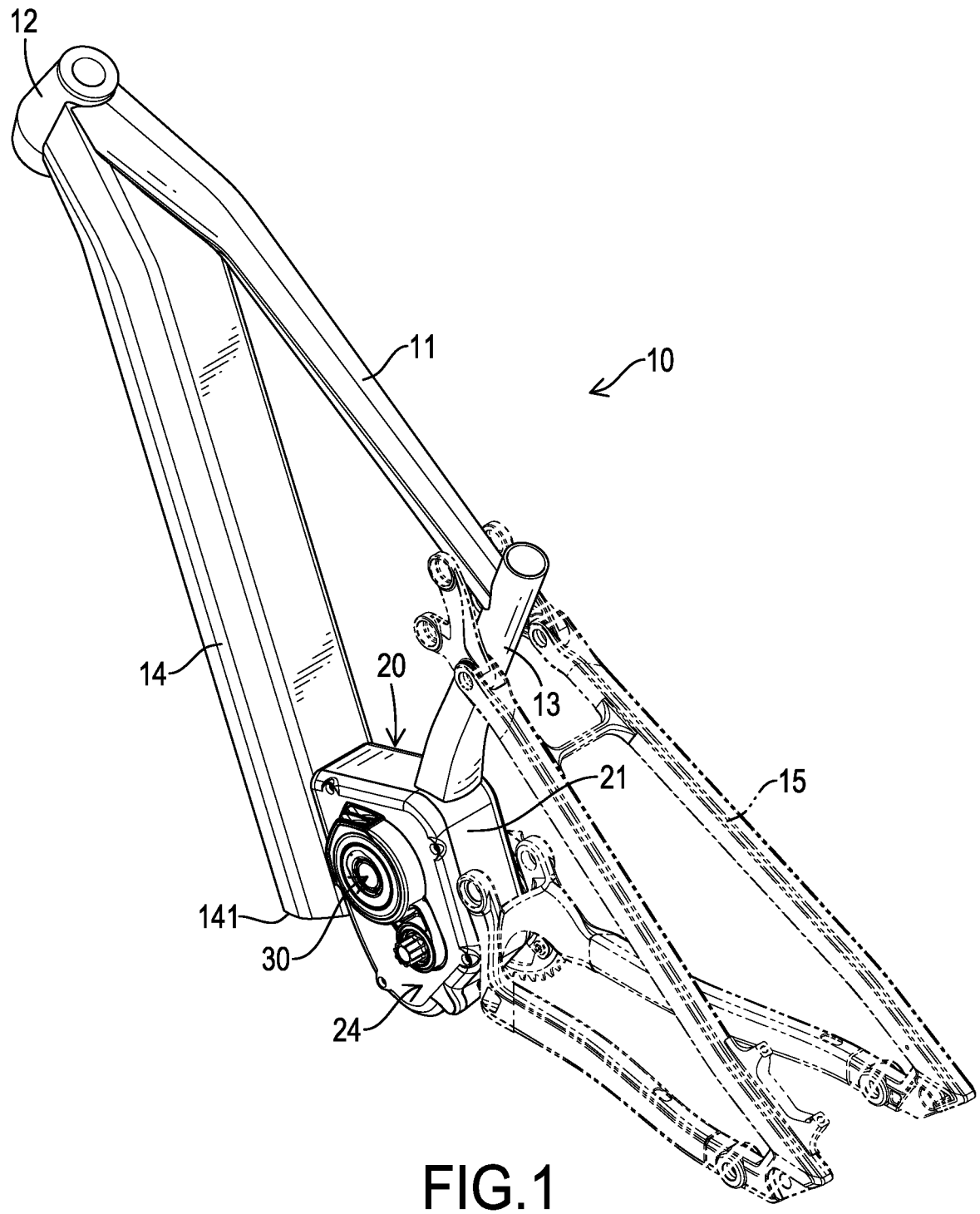
FIG. 1 is a perspective view of a motor mounting assembly of an electric bicycle in accordance with the present invention.
Figure 2:
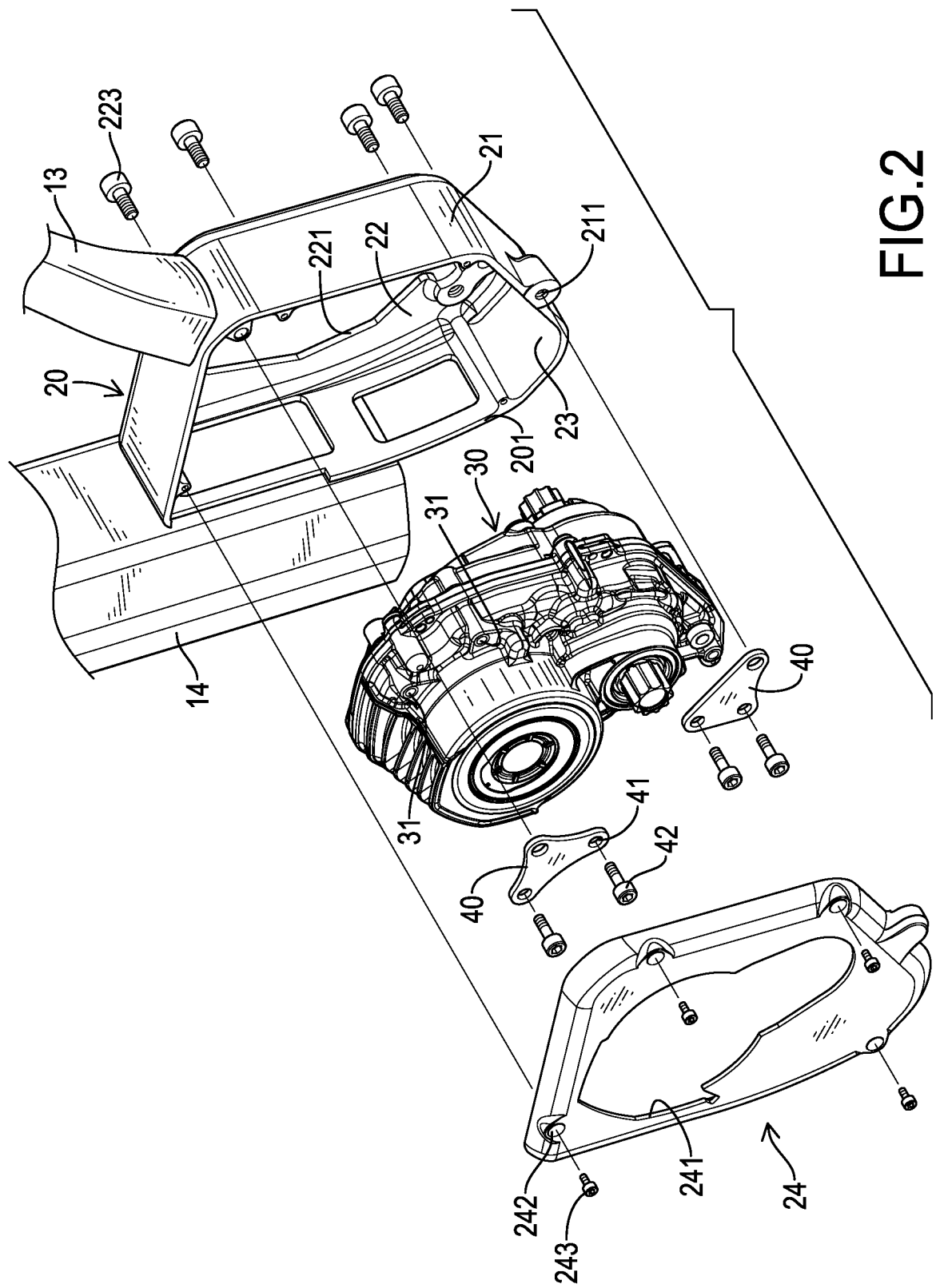
FIG. 2 is an exploded perspective view of the motor mounting assembly of the electric bicycle in FIG. 1.
Figure 3:
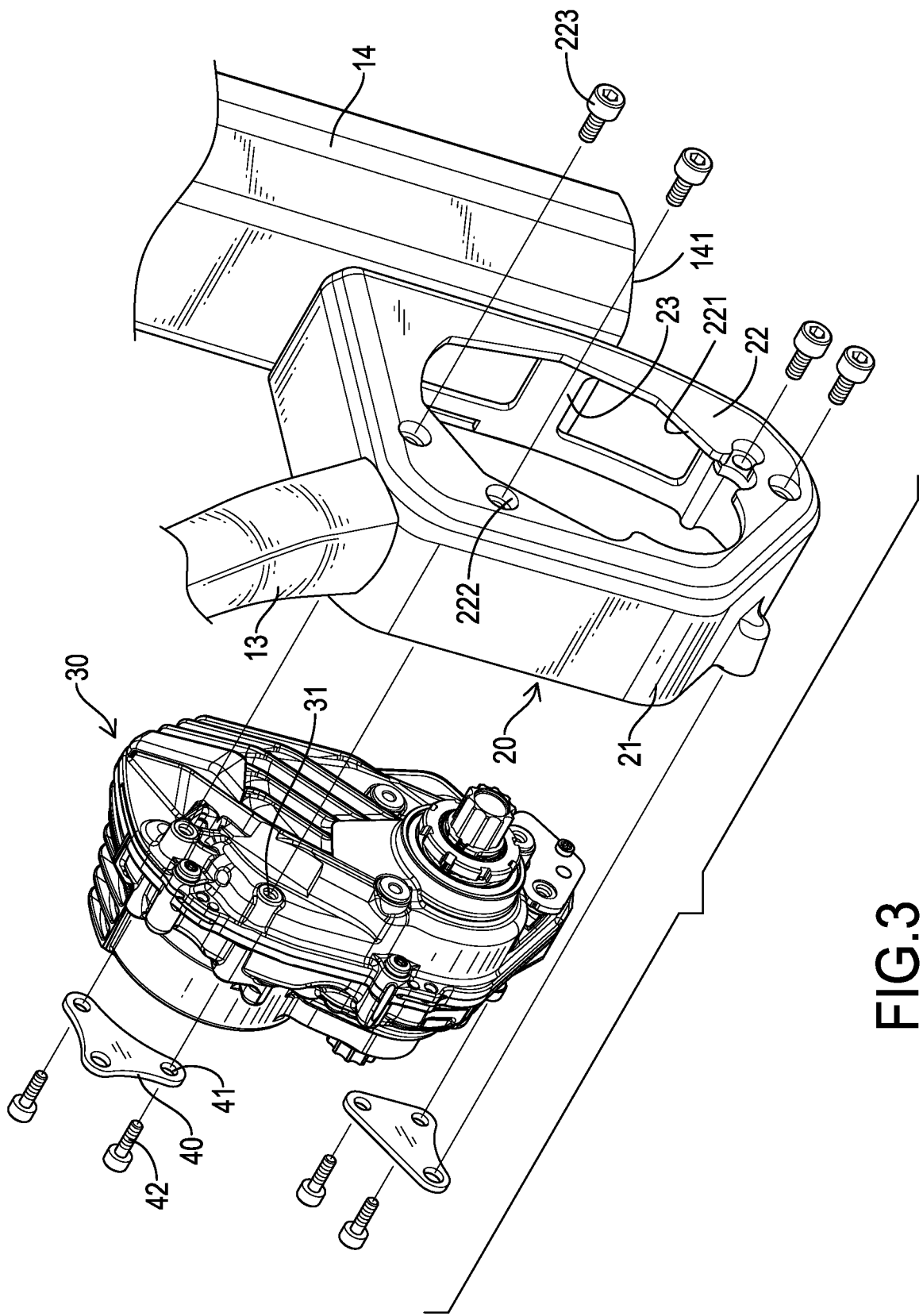
FIG. 3 is another exploded perspective view of the motor mounting assembly of the electric bicycle in FIG. 1.

With reference to FIGS. 1 to 3, a motor mounting assembly of an electric bicycle in accordance with the present invention has a bicycle frame 10, a motor-installation mount 20 connected to the bicycle frame 10, a motor unit 30 assembled to the motor-installation mount 20, and two adapting pieces 40 designed for the motor unit 30. A first side and a second side are oppositely defined on the motor unit 30 and respectively have multiple fins. The motor unit 30 also has a driven shaft for connecting the crank and the chainwheel of the bicycle. The first and second sides of the motor unit 30 have multiple threaded holes 31 respectively. The multiple threaded holes 31 of each side of the motor unit 30 are disposed along a margin of the motor unit 30. The multiple threaded holes 31 of each side of the motor unit 30 are configured to assemble the motor unit 30 via bolted connection.

Wherein, the bicycle frame 10 has a top tube 11 being substantially horizontal, a head tube 12 connected to a front end of the top tube 11, a seat tube 13 connected to a rear end of the top tube 11, a down tube 14 with a front end connected to the head tube 12, and a seat stay 15 connected to the seat tube 13 and disposed behind the seat tube 13. Batteries may be received within the down tube 14 and can be replaced via an accessing opening 141 disposed at a bottom end of the down tube 14. The bicycle frame 10 of the present invention is similar to conventional bicycle frames. Detailed description of the bicycle frame 10 is omitted accordingly.

The motor-installation mount 20 has a mounting frame 21, a lateral plate 22, an installation space 23, and a lateral cover 24. The mounting frame 21 is annular and has a first lateral side, a second lateral side, and a lateral opening 201 disposed on the first lateral side of the mounting frame 21. The first side and the second side of the motor unit 30 respectively face the first lateral side and the second lateral side of the motor-installation mount 20. The lateral plate 22 is integrally formed on the second lateral side of the mounting frame 21. The installation space 23 is disposed within the motor-installation mount 20 and is enclosed and formed by the mounting frame 21 and the lateral plate 22. The lateral cover 24 is detachably assembled to the first lateral side via bolted connection and covers the lateral opening 201. The mounting frame 21 has a contour being polygonal and corresponding to the contour of the motor unit 30. The mounting frame 21 also has a width smaller than a width of the motor unit 30. The mounting frame 21 further has multiple threaded bores 211 disposed at intervals on the first lateral side of the mounting frame 21. The threaded bores 211 are designed corresponding to each adapting piece 40 and the lateral cover 24. A top side of the mounting frame 21 is welded to a bottom end of the seat tube 13. A front side of the mounting frame 21 is welded to a corresponding side of the down tube 14. Therefore, the motor-installation mount 20 is stably and firmly connected to the bicycle frame 10 and is free from blocking the accessing opening 141 disposed at the bottom end of the down tube 14.

Figure 4:
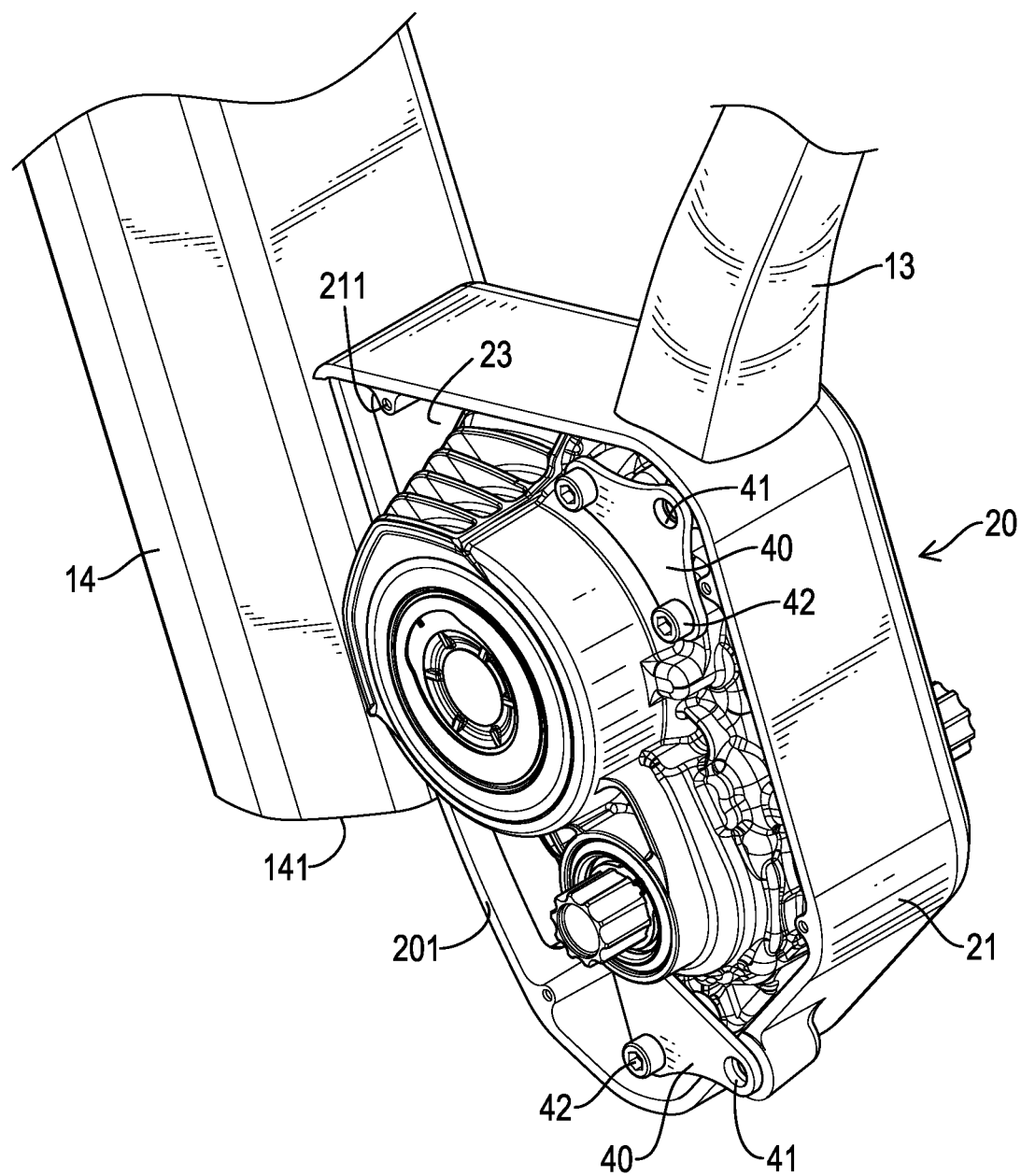
FIG. 4 is a perspective view of the motor mounting assembly of the electric bicycle in FIG. 1, showing a lateral cover of a motor-installation mount being omitted.
Figure 5:
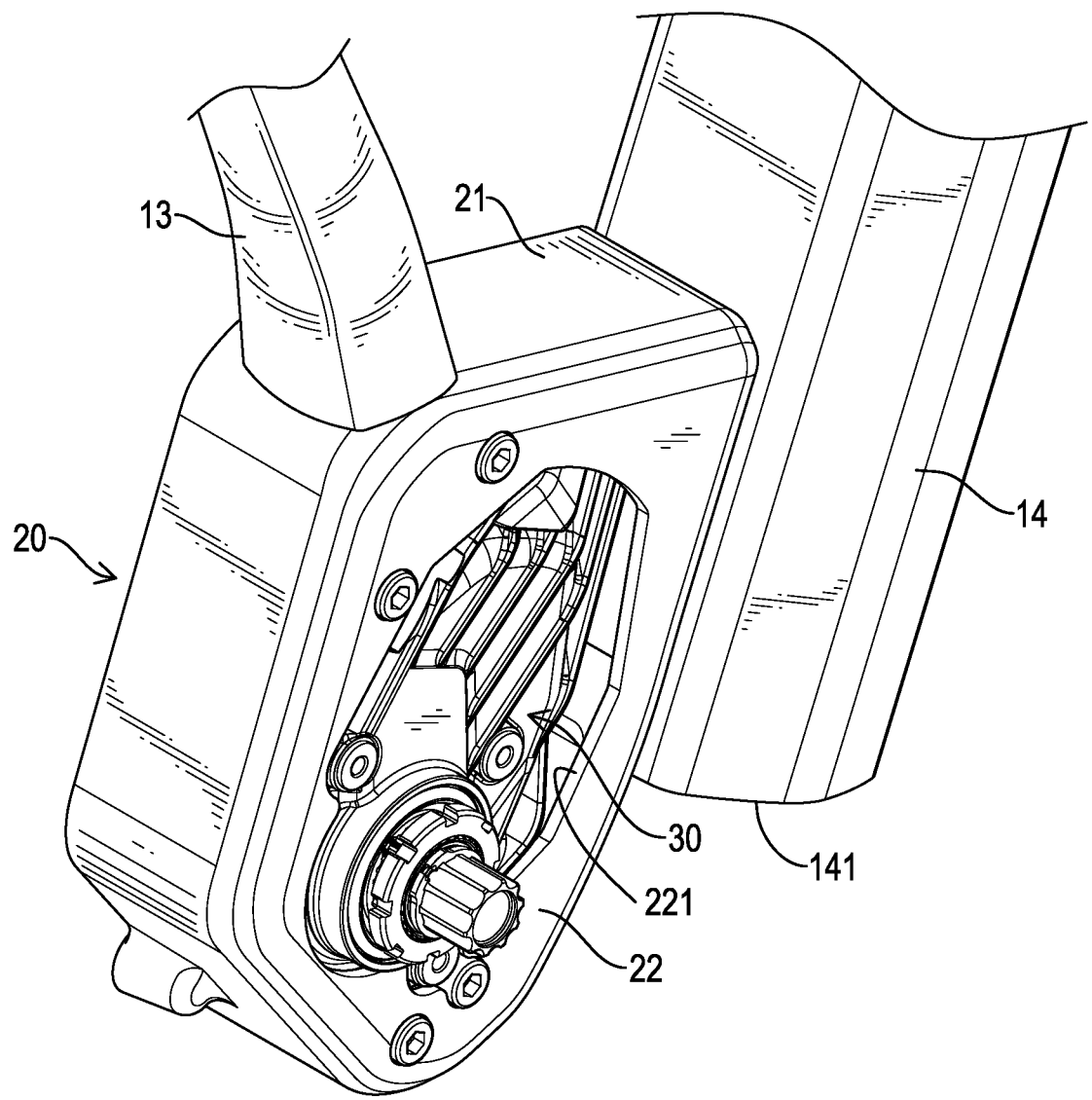
FIG. 5 is a perspective view of the motor mounting assembly of the electric bicycle in FIG. 1, showing a motor unit disposed within the motor-installation mount.

The lateral plate 22 is directly and integrally formed on and connected to the second lateral side of the mounting frame 21. The lateral plate 22 has a through hole 221 for the fins of the first side and the driven shaft of the motor unit 30 to protrude therein. The lateral plate 22 also has multiple fastening holes 222. The multiple fastening holes 222 correspond to the multiple threaded holes 31 of the motor unit 30 in position. With reference to FIGS. 3 and 5, multiple bolts 223 are respectively mounted through the multiple fastening holes 222 and are threaded to the multiple threaded holes 31 to fix the second side of the motor unit 30 to the mounting frame 21. With reference to FIGS. 2 and 4, the mounting frame 21, the lateral plate 22, and the lateral cover 24 surround the installation space 23 to facilitate the motor unit 30 to be fitted and assembled in the installation space 23.

With reference to FIGS. 1 and 2, the lateral cover 24 is a plate-like cover and corresponds to the mounting frame 21 in shape. The lateral cover 24 has a through hole 241 defined through a surface of the lateral cover 24. The through hole 241 of the lateral cover 24 is configured for the fins of the first side and the driven shaft of the motor unit 30 to protrude therein. The lateral cover 24 further has multiple threading bores 242 corresponding to the multiple threaded bores 211 of the mounting frame 21 in position. Multiple bolts 243 can be respectively mounted through the multiple threading bores 242 and respectively threaded to the multiple threaded bores 211 to fix the lateral cover 24 to the mounting frame 21 such that the lateral cover 24 covers the lateral opening 201.

With reference to FIGS. 2 and 4, each adapting piece 40 is substantially triangular and has three fixing holes 41 respectively disposed at three corners of the adapting piece 40. Two of the three fixing holes 41 correspond to the threaded holes 31 of the motor unit 30 in position. Two bolts 42 are respectively mounted through the two fixing holes 41 and are respectively threaded to corresponding two of the multiple threaded holes 31 to fix the adapting piece 40 to the motor unit 30. The last one of the three fixing holes 41 corresponds to threaded bores 211 of the mounting frame 21 in position. A corresponding one of said bolts 243 is mounted through the fixing hole 41 to connect the adapting piece 40 and the motor-installation mount 20 to achieve the effect that connects a corresponding side of the motor unit 30 and the motor-installation mount 20.

Figure 6:
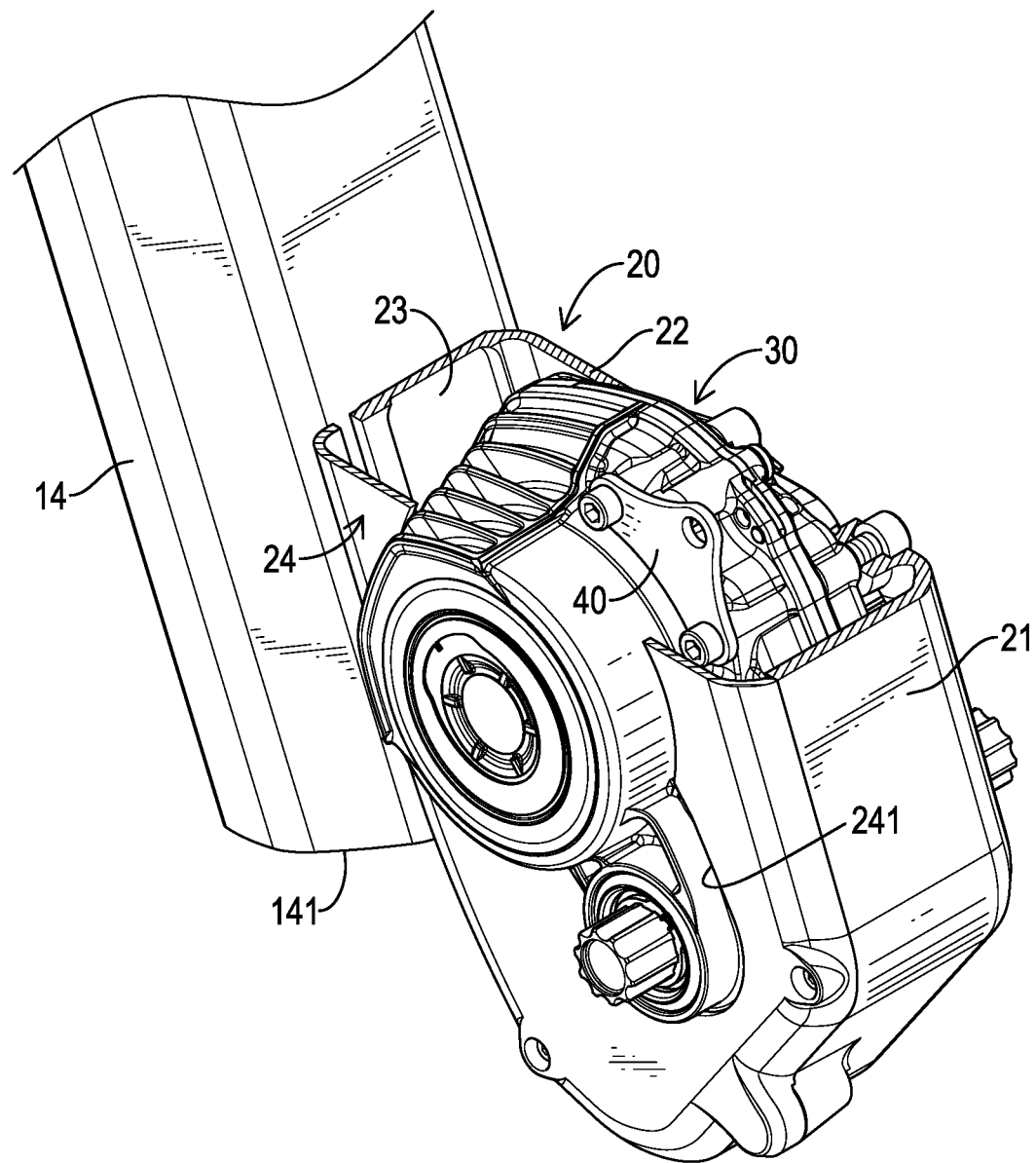
FIG. 6 is a perspective view in partial section of the motor mounting assembly of the electric bicycle.

With reference to FIGS. 1, 2, and 6, the motor-installation mount 20 is an enhanced mount structure with the mounting frame 21 and the installation space 23. Accompanied with the adapting pieces 40 and the bolts 223, 42, 243, the motor unit 30 is fixed within the installation space 23 and protected by the mounting frame 21. Installation stability and durability of the motor unit 30 are highly promoted accordingly. With connection of the seat tube 13, the down tube 14, and the motor-installation mount 20, rigidity of the bicycle frame 10 is enhanced. With reference to FIG. 4, the motor-installation mount 20 is connected to the corresponding side of the down tube 14 and is free from blocking the accessing opening 141 disposed at the bottom end of the down tube 14. The batteries within the down tube 14 can be replaced from the accessing opening 141 without removing the motor unit 30.

With reference to FIGS. 4 and 6, the motor unit 30 can be laterally placed into the installation space 23 of the motor-installation mount 20. With the adapting pieces 40, the motor-installation mount 20 can be connected with motor units of various specifications.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A motor mounting assembly of an electric bicycle, and the motor mounting assembly comprising:
   a motor-installation mount having
      a mounting frame being annular and having
         a first lateral side;
         a second lateral side; and
         a lateral opening disposed on the first lateral side;
      a lateral plate formed on the second lateral side and having a through hole;
      an installation space formed by the mounting frame and the lateral plate;

a lateral cover detachably assembled to the first lateral side, covering the lateral opening, and having a through hole;

a motor unit received in the installation space of the motor-installation mount and having a first side and a second side oppositely defined on the motor unit, the first side of the motor unit facing the first lateral side of the motor-installation mount and partially protruding in the through hole of the lateral cover, and the second side of the motor unit facing the second lateral side of the motor-installation mount and partially protruding in the through hole of the lateral plate; and each one of the first and second sides of the motor unit having multiple threaded holes disposed along a margin of the motor unit at intervals, wherein the motor unit is fastened to the lateral plate via multiple bolts mounted through the lateral plate and fastened in the threaded holes on the second side of the motor unit; and at least one adapting piece mounted between the motor unit and the lateral cover, and each of the at least one adapting piece having two fastening portions;

one of the two fastening portions of each of the at least one adapting piece fastened to at least one of the threaded holes on the first side of the motor unit via at least one bolt;

the other fastening portion clamped between the lateral cover and the mounting frame and fastened to the lateral cover and the mounting frame via at least one bolt.

2. The motor mounting assembly of the electric bicycle as claimed in claim 1, wherein a contour of the mounting frame and a contour of the motor unit correspond in shape;

a width of the mounting frame is smaller than a width of the motor unit;

a top side of the mounting frame is connected to a bottom end of a seat tube; and a front side of the mounting frame is connected to a corresponding side of a down tube.

3. The motor mounting assembly of the electric bicycle as claimed in claim 1, wherein the mounting frame has multiple threaded bores disposed at intervals on the first lateral side of the mounting frame;

the lateral cover has multiple threading bores, wherein multiple bolts are respectively mounted through the multiple threading bores of the lateral cover and respectively fastened to the threaded bores of the mounting frame for fastening the lateral cover to the mounting frame.

4. The motor mounting assembly of the electric bicycle as claimed in claim 1, wherein each one of the at least one adapting piece has at least two fixing holes;

the at least one bolt is mounted through at least one of the at least two fixing holes of each one of the at least one adapting piece to fasten the adapting piece to the motor unit; and at least one of the at least two fixing holes of each one of the at least one adapting piece aligns with the threaded bores of the mounting frame for fastening the adapting piece to the motor-installation mount.

5. The motor mounting assembly of the electric bicycle as claimed in claim 2, wherein each one of the at least one adapting piece has at least two fixing holes;

the at least one bolt is mounted through at least one of the at least two fixing holes of each one of the at least one adapting piece to fasten the adapting piece to the motor unit; and at least one of the at least two fixing holes of each one of the at least one adapting piece aligns with the threaded bores of the mounting frame for fastening the adapting piece to the motor-installation mount.

6. The motor mounting assembly of the electric bicycle as claimed in claim 3, wherein each one of the at least one adapting piece has at least two fixing holes;

the at least one bolt is mounted through at least one of the at least two fixing holes of each one of the at least one adapting piece to fasten the adapting piece to the motor unit; and at least one of the at least two fixing holes of each one of the at least one adapting piece aligns with the threaded bores of the mounting frame for fastening the adapting piece to the motor-installation mount.

7. The motor mounting assembly of the electric bicycle as claimed in claim 4, wherein the at least one adapting piece includes two adapting pieces;

each one of the two adapting pieces is triangular and has three fixing holes respectively disposed at three corners of the adapting piece;

two bolts are mounted through two of the three fixing holes of each one of the two adapting pieces to fasten the adapting piece to the motor unit, and the other one of the three fixing holes of the adapting pieces aligns with one of the threaded bores of the mounting frame for fastening the adapting piece to the motor-installation mount.

8. The motor mounting assembly of the electric bicycle as claimed in claim 5, wherein the at least one adapting piece includes two adapting pieces;

each one of the two adapting pieces is triangular and has three fixing holes respectively disposed at three corners of the adapting piece;

two bolts are mounted through two of the three fixing holes of each one of the two adapting pieces to fasten the adapting piece to the motor unit, and the other one of the three fixing holes of the adapting pieces aligns with one of the threaded bores of the mounting frame for fastening the adapting piece to the motor-installation mount.

9. The motor mounting assembly of the electric bicycle as claimed in claim 6, wherein the at least one adapting piece includes two adapting pieces;

each one of the two adapting pieces is triangular and has three fixing holes respectively disposed at three corners of the adapting piece;

two bolts are mounted through two of the three fixing holes of each one of the two adapting pieces to fasten the adapting piece to the motor unit, and the other one of the three fixing holes of the adapting pieces aligns with one of the threaded bores of the mounting frame for fastening the adapting piece to the motor-installation mount.

* * * * *